(12) United States Patent
Means et al.

(10) Patent No.: US 12,603,842 B2
(45) Date of Patent: Apr. 14, 2026

(54) ON-DEMAND VIRTUAL ROUTING AND FORWARDING TABLE CREATION

(71) Applicant: AT&T Intellectual Property I, L.P., Atlanta, GA (US)

(72) Inventors: Israel Means, Chula Vista, CA (US); Praveen Ramadenu, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 567 days.

(21) Appl. No.: 17/729,189

(22) Filed: Apr. 26, 2022

(65) Prior Publication Data

US 2023/0344765 A1    Oct. 26, 2023

(51) Int. Cl.
*H04L 45/76*        (2022.01)
*H04L 41/084*       (2022.01)
*H04L 45/02*        (2022.01)

(52) U.S. Cl.
CPC .......... *H04L 45/76* (2022.05); *H04L 41/0843* (2013.01); *H04L 45/04* (2013.01)

(58) Field of Classification Search
CPC ....... H04L 45/76; H04L 45/04; H04L 45/033; H04L 45/586; H04L 45/03; H04L 41/0806; H04L 41/20; H04L 41/0895; H04L 41/0897; H04L 41/0816; H04L 41/0886; H04L 41/0843
See application file for complete search history.

(56) References Cited

U.S. PATENT DOCUMENTS

| | | | | |
|---|---|---|---|---|
| 2005/0188106 A1* | 8/2005 | Pirbhai | .................. | H04L 45/54 709/238 |
| 2006/0209682 A1* | 9/2006 | Filsfils | .................... | H04L 45/04 370/219 |
| 2007/0177596 A1* | 8/2007 | Bapat | .................... | H04L 45/502 370/392 |
| 2011/0134931 A1* | 6/2011 | Merwe | ............... | H04L 41/0843 370/401 |
| 2013/0117449 A1* | 5/2013 | Hares | ...................... | H04L 45/04 709/225 |
| 2016/0366043 A1* | 12/2016 | Bregger | ................. | H04L 12/66 |
| 2019/0028381 A1* | 1/2019 | Li | ........................... | H04L 45/04 |
| 2020/0014605 A1* | 1/2020 | Means | ................. | H04L 45/245 |
| 2020/0389358 A1* | 12/2020 | Kamath | ............. | H04L 41/0672 |

(Continued)

OTHER PUBLICATIONS

A Framework for the Establishment of Inter-Domain, On-Demand VPNs (Year: 2008).*

(Continued)

*Primary Examiner* — Yemane Mesfin
*Assistant Examiner* — Guoxing Fan
(74) *Attorney, Agent, or Firm* — GUNTIN & GUST, PLC; Colin Larose

(57)        ABSTRACT

Aspects of the subject disclosure may include, for example, network device(s) capable of on-demand virtual routing and forwarding (VRF) table creation. A network device may receive a request from a customer device requesting on-demand VRF creation, and may instantiate and provision a VRF in response. The request made by the customer device may be made by announcing an attribute in a border gateway protocol (BGP) message. Other embodiments are disclosed.

20 Claims, 9 Drawing Sheets

(56) References Cited

U.S. PATENT DOCUMENTS

2022/0278897 A1* 9/2022 Batross ............... H04L 41/0843

OTHER PUBLICATIONS

New Architecture for a VPN On-demand Interconnection System (Year: 2010).*
A distributed signaling for the provisioning of on-demand VPN services in transport networks (Year: 2007).*
On Dynamic Migration of Virtual Router (Year: 2016).*
BGP Flowspec Redirect to VPN RD Extended Community draft-yong-idr-flowspec-redirect-vpn-rd-00 (Year: 2016).*
BGP Flow-Spec Redirect to Tunnel Action draft-hao-idr-flowspec-redirect-tunnel-01.txt (Year: 2016).*
Configuring BGP to Block Denial-of-Service Attacks draft-turk-bgp-dos-06.txt (Year: 2004).*
RFC 5575 (Year: 2009).*
RFC 4364 (Year: 2006).*
RFC 4271 (Year: 2006).*
RFC 4360 (Year: 2006).*
Linux Networking Documentation—Virtual Routing and Forwarding (VRF) (Year: 2022).*
cisco.mso.mso_schema_template_vrf—Manage VRFs in schema templates (Year: 2020).*
The Study of MPLS VPN Billing Model (Year: 2003).*
Dynamic VPN Communities: Implementation and Experience (Year: 2001).*
"BGP Zero to Hero Part 7, BGP Communities", The Cisco Learning Network, Feb. 7, 2022, 21 pages.

* cited by examiner

200B

200C

Provider Edge Router (PE)

Customer Edge Router (CE)

CE-PE BGP session and VLAN

Default Routing Table — 210B

212B

212C

Auto-Generated VRF — 210C

112

Dynamic config process logic
230A

200D

150

Provider Edge Router (PE)

Customer Edge Router (CE)

CE-PE BGP session and VLAN

Auto-Generated VRF

212C

112

150

210C

200E

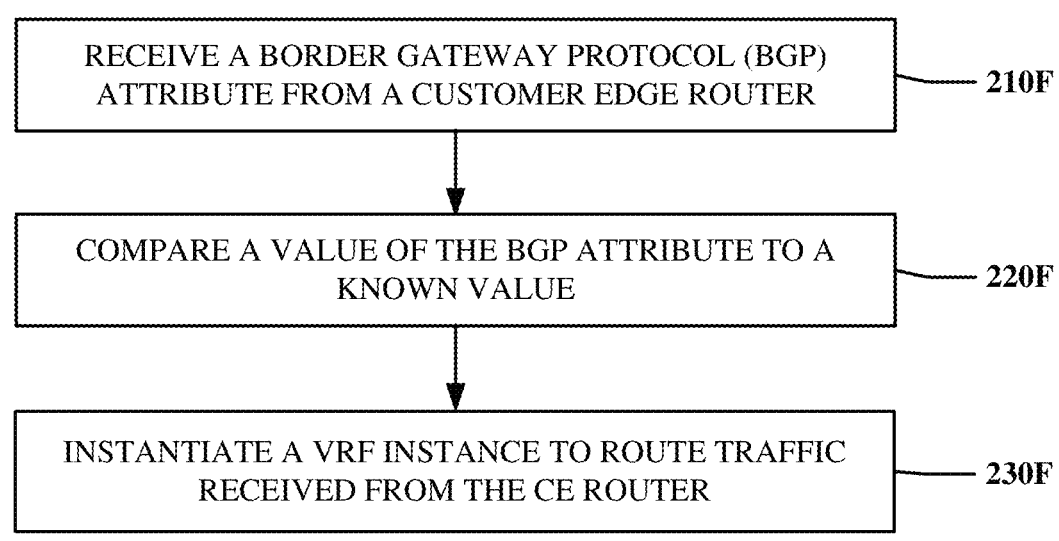

RECEIVE A BORDER GATEWAY PROTOCOL (BGP) ATTRIBUTE FROM A CUSTOMER EDGE ROUTER — 210F

COMPARE A VALUE OF THE BGP ATTRIBUTE TO A KNOWN VALUE — 220F

INSTANTIATE A VRF INSTANCE TO ROUTE TRAFFIC RECEIVED FROM THE CE ROUTER — 230F

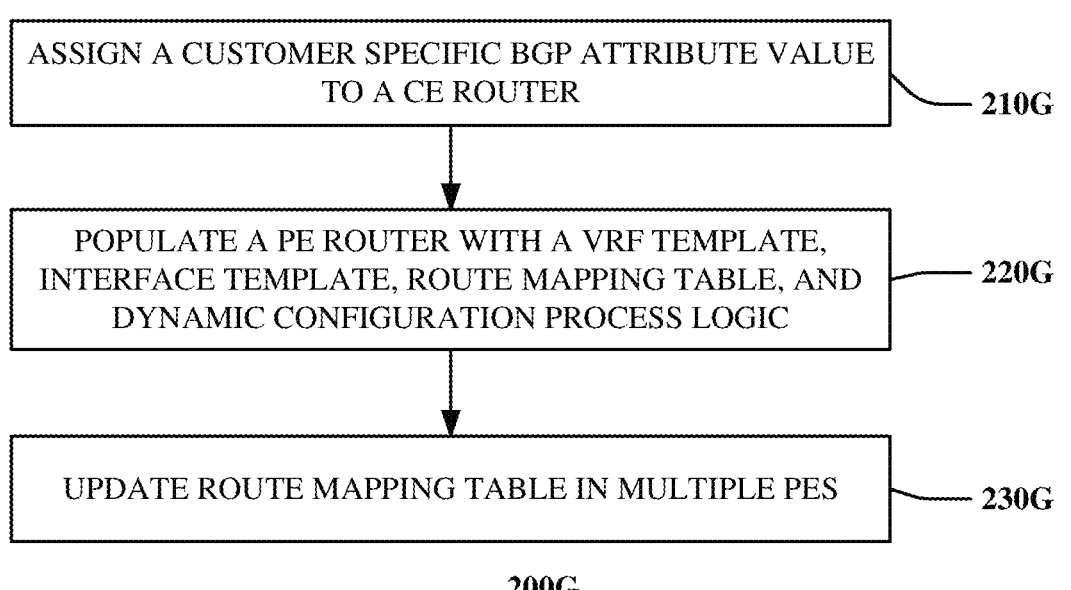

ASSIGN A CUSTOMER SPECIFIC BGP ATTRIBUTE VALUE TO A CE ROUTER — 210G

POPULATE A PE ROUTER WITH A VRF TEMPLATE, INTERFACE TEMPLATE, ROUTE MAPPING TABLE, AND DYNAMIC CONFIGURATION PROCESS LOGIC — 220G

UPDATE ROUTE MAPPING TABLE IN MULTIPLE PES — 230G

ON-DEMAND VIRTUAL ROUTING AND FORWARDING TABLE CREATION

FIELD OF THE DISCLOSURE

The subject disclosure relates to virtual routing and forwarding (VRF) in networks.

BACKGROUND

Virtual routing and forwarding (VRF) is a construct commonly used in virtual private networks (VPN). VRF is an extension of internet protocol (IP) routing that provides separate IP routing and forwarding tables within a single router to route and forward traffic for different VPNs.

VRF tables are typically provisioned manually or with varying degrees of automation. Manual provisioning typically requires a VPN administrator to manually enter information into one or more routers to define the routing, forwarding, and interfaces used in a VPN. Automation is typically accomplished using external provisioning systems that apply configuration information to many routers at once, typically during low usage times (e.g., overnight). The use of automation can reduce labor requirements, but can also introduce delays in provisioning VRFs and VPNs.

BRIEF DESCRIPTION OF THE DRAWINGS

Reference will now be made to the accompanying drawings, which are not necessarily drawn to scale, and wherein:

FIGS. 2F and 2G depict illustrative embodiments of methods in accordance with various aspects described herein.

DETAILED DESCRIPTION

The subject disclosure describes, among other things, illustrative embodiments for on-demand VRF creation (also referred to herein as instantiation and/or provisioning). Specific devices in a network (e.g., provider edge routers) create and provision VRF table(s) based on information received from a customer device (e.g., customer edge router). Other embodiments are described in the subject disclosure.

One or more aspects of the subject disclosure include a device, comprising a processing system including a processor; and a memory that stores executable instructions that, when executed by the processing system, facilitate performance of operations. The operations may include receiving a first border gateway protocol (BGP) attribute from a customer edge (CE) router; comparing a value of the first BGP attribute to a known attribute value; and responsive to the comparing, instantiating a virtual routing and forwarding (VRF) instance to route traffic received from the CE router.

One or more aspects of the subject disclosure include a non-transitory, machine-readable medium, comprising executable instructions that, when executed by a processing system including a processor, facilitate performance of operations. The operations may include receiving a first border gateway protocol (BGP) attribute from a customer edge (CE) router; comparing a value of the first BGP attribute to a known attribute value; and responsive to the comparing, instantiating a virtual routing and forwarding (VRF) instance to route traffic received from the CE router.

One or more aspects of the subject disclosure include a method, comprising: receiving, by a processing system including a processor, a first border gateway protocol (BGP) attribute from a customer edge (CE) router; comparing, by the processing system, a value of the first BGP attribute to a known attribute value; and responsive to the comparing, instantiating, by the processing system, a virtual routing and forwarding (VRF) instance to route traffic received from the CE router.

Additional aspects include the device being a provider edge (PE) router, the value of the first BGP attribute comprising a community value, assigning a customer specific community value to the CE router, the comparing the value of the first BGP attribute comprising comparing the community value to the customer specific community value, and the receiving the first BGP attribute comprising receiving a BGP update message from the CE router; and detecting a community value within the BGP update message.

Further additional aspects include the instantiating the VRF instance comprising copying a VRF template to create the VRF instance, mapping the value of the first BGP attribute to a route target to populate the VRF instance, receiving updates to a table used to map the value of the first BGP attribute to the route target, and moving an interface from a routing table to the VRF instance.

Figure 1:
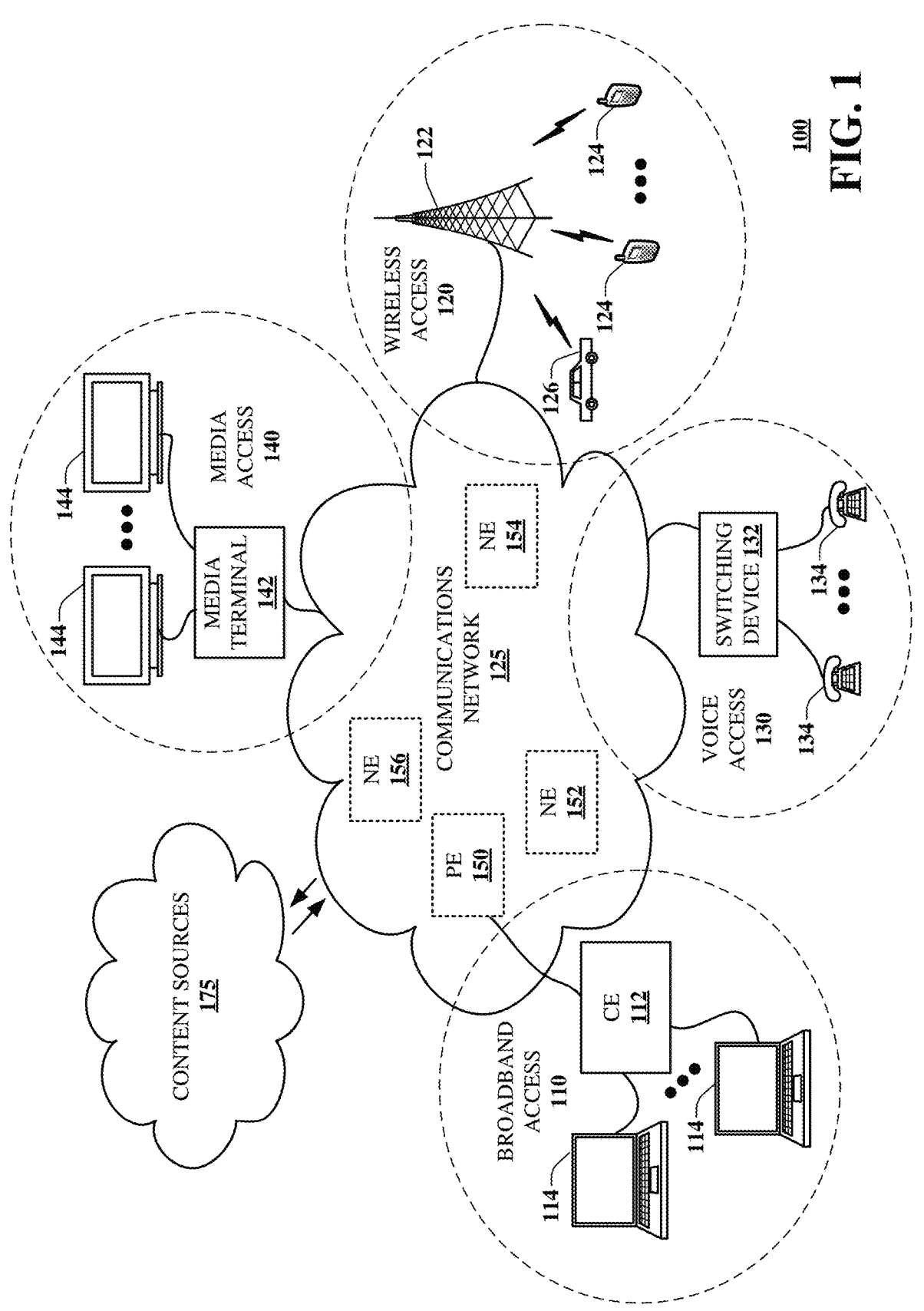
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part on-demand VRF creation and provisioning at a CE router. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of provider edge routers (PE) 150 and a plurality of network elements (NE) 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, customer edge router (CE) 112 can include any routing device that is in communication with a provider edge (PE) router 150. For example, CE 112 may be a digital subscriber line access multiplexer (DSLAM), cable modem termination system (CMTS), optical line terminal (OLT) and/or other access terminal or router. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, CE 112 communicates with PE 150 using border gateway protocol (BGP), and sends BGP update messages with routing information and other attributes. One or more BGP attributes or attribute values may be recognized by PE 150 as a request for a secure connection. For example, in some embodiments, CE 112 may include a community value in a BGP update message that triggers PE 150 to create a VRF on-demand in support of a VPN. In some embodiments, the community value is assigned to CE 112, or a customer associated with CE 112, by the operator of communications network 125. When the same community value is received by PE 150, PE 150 may copy a VRF template to instantiate a VRF table, use the community value to index into a table that maps community values to route targets, and provision the new VRF table with the appropriate route target. PE 150 may also move an interface from a default routing table to the newly created and provisioned VRF to route traffic received from CE 112 through the newly created VPN. These and other embodiments are further described below.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the provider edge router 150 and network elements 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Various embodiments provide a self-provisioning aspect to network devices such as network routing devices (e.g., PE routers, NEs, etc.). In some embodiments, the self-provisioning in network devices is in response to specific requests coming from endpoint devices (e.g., CE routers), or coming from other devices under the influence of endpoint users. For example, a user may wish to process a secure credit card transaction, and in response, a CE router (e.g., CE 112) that connects a user device (e.g., data terminal 114) to a communications network (e.g., network 125) may send a request to a PE router (e.g., PE 150) to instantiate and provision a VRF to route the credit card transaction over a secure connection such as a VPN.

In response to the request from the CE router, the PE router may provide on-demand self-provisioning of a VRF. For example, the PE router may instantiate a VRF, populate the VRF with one or more route targets, and move an interface from a default routing table to the VRF, all in response to the request made by the user (or user device or CE). Once the secure transaction is complete, the CE router may send a request to the PE router to remove the VRF, and once again route user traffic according to the default routing table. In response, the PE router may move the interface from the VRF back to the default routing table and delete the VRF. This VRF/VPN self-provisioning functionality provided by various embodiments allows specific devices in the network to provision themselves based on information they detect coming from a user.

As further described below, the communication between a user device (e.g., CE router) and a provider device (e.g., PE router) that facilitates on-demand instantiation and provisioning of secure connections may take many forms. For example, an endpoint enterprise that communicates with the network through a CE may implement this capability by setting an attribute within a routing context, and advertise the attribute to the network operator (e.g., and ISP). The network operator may then parse that routing attribute at its routing edge device (e.g., PE router) and place that connection (the connection from which the attribute was received) into a VRF construct. In some embodiments, one or more BGP community values are assigned to a user, group of users, or enterprise, and those community values are used to request on-demand VRF creation and provisioning as well as to request on-demand VRF removal and once again routing user traffic according to the default routing table.

In various embodiments, one entity (e.g., user, group of users, enterprise, etc.) may be assigned different community values corresponding to different route targets within one or more VPNs. For example, a user may be assigned a first community value corresponding to a secure connection to the user's employer's servers, and may be assigned a second community value corresponding to a secure connection to the user's financial institution. When the user desires a secure connection to the user's employer's servers, a CE that routes data traffic for the user may send the first community value as a BGP attribute to a PE router of a network provider. Similarly, when the user desires a secure connection to the user's financial institution, a CE that routes data traffic for the user may send the second community value as a BGP attribute to a PE router of a network provider. The user may also be assigned one or more community values to return to a default routing context. For example, a user may be assigned a third community value that is used for every request to return to a default routing context (e.g., to "tear down" a secure connection to the user's employer's servers, or to tear down a secure connection to the user's financial institution). Also for example, the user may be assigned different community values to be used to request that different secure connections be torn down. In these embodiments, community values may be assigned in pairs (e.g., one community value to request a secure connection, and a second community value to be used to return the user from the secure connection to a default routing context).

In some embodiments, the network provider may track the amount of time that the on-demand VRF is in place, and may use this information to determine an amount to charge a user or enterprise for the secure connection. Also in some embodiments, the network provider may track the amount of data that traverses a VPN using an on-demand VRF to determine an amount to charge a user or enterprise for the secure connection.

These and other embodiments empower users that up until now have been unable to gain convenient access to a more secure infrastructure—either because it took too long to establish or because it was cost prohibitive—to initiate the creation of on-demand VPN connections at a price point that reflects actual usage rather than a dedicated secure connection.

Figure 2A:
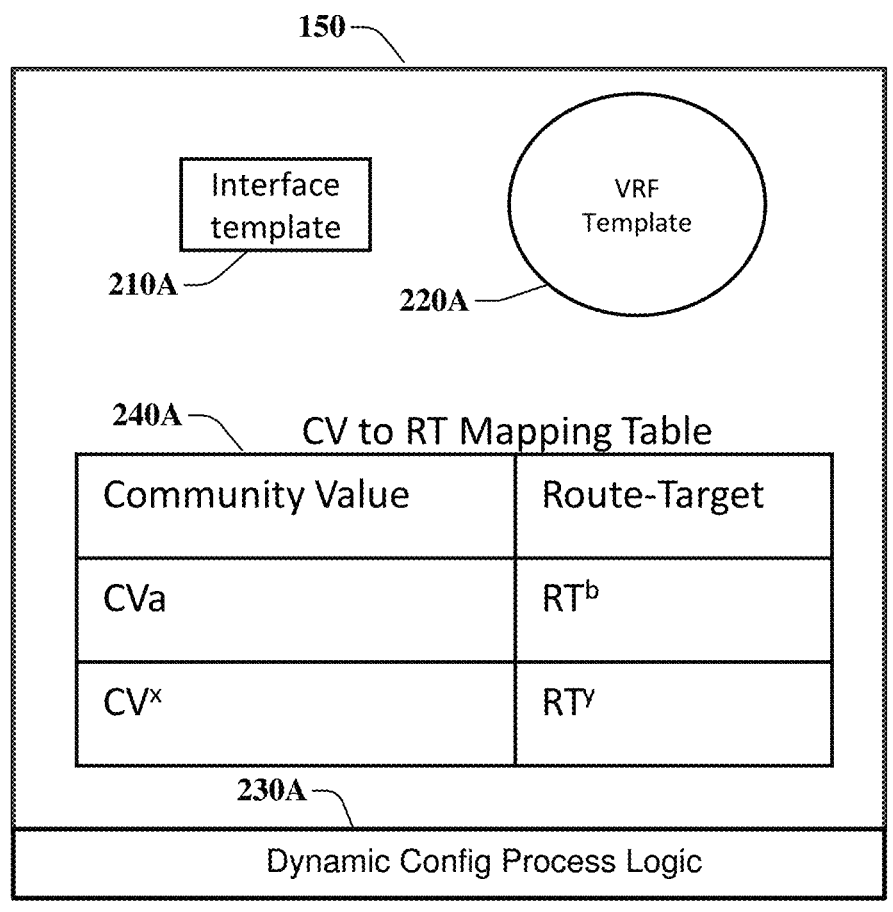
FIG. 2A is a block diagram illustrating an example, non-limiting embodiment of a provider edge (PE) router in accordance with various aspects described herein.

FIG. 2A is a block diagram illustrating an example, non-limiting embodiment of a provider edge (PE) router in accordance with various aspects described herein. As shown in FIG. 2A, PE router 150 includes interface template 210A, VRF template 220A, community value (CV) to route target (RT) mapping table 240A, and dynamic configuration process logic 230A. PE router 150 may also include many other components not shown in FIG. 2A. For example, PE router 150 may include a default routing table and one or more VRFs to support one or more VPNs.

VRF template 220A is a blank version of a VRF construct. For example, VRF template 220A may include one or more data structures in a memory device, that when copied and populated with data results in an instantiated and provisioned VRF. Similarly, interface template 210A is a blank version of an interface for a routing table (e.g., a default routing table or VRF) that directs data traffic to and from a customer edge device. CV to RT mapping table 240A is a table in a memory device that maps an attribute received from a CE router to a route target. For example, in some embodiments, the attribute may be a community value received in a BGP update message. Also for example, the route target may be an address of a router used in a secure connection such as a VPN.

In some embodiments, one or more of templates 210A and 220A, and mapping table 240A are unique to each PE router maintained and managed by a network operator. For example, in some embodiments, templates 210A and 220A are common across all PE devices managed by a network operator and mapping table 240A may be different for each PE device. In these embodiments, the mapping tables in the different PE devices are populated with CV to RT mappings that correspond to CVs that are expected to be received from users and customers served by that particular PE device. In other embodiments, mapping table 240A is also common across all PE devices that include on-demand instantiation and provision of VRFs. In these embodiments, updates to mapping table 240A are pushed to every PE device that includes this functionality.

Dynamic configuration process logic (DCPL) 230A provides functionality for on-demand VRF creation (e.g., instantiating and provisioning). For example, DCPL 230A may monitor one or more BGP sessions between PE 150 and one or more CE devices. When an attribute that represents a request for on-demand instantiation and provisioning of a VRF is received, DCPL 230A may copy VRF template 220A to instantiate a blank (or partially blank) VRF. DCPL 230A then accesses mapping table 240A using the attribute (e.g., community value) to determine a route target to provision the newly instantiated VRF. DCPL 230A then instantiates an interface using interface template 210A and moves the interface from the routing table currently in use (e.g., default routing table) to the newly instantiated VRF. At this point, DCPL 230A has instantiated and provisioned an on-demand VRF for use by the CE that provided the request by including an attribute (e.g., community value) in a BGP message.

Dynamic configuration process logic 230A may be implemented in any manner. For example, in some embodiments, PE router 150 includes one or more processors and memory, and DCPL 230A is implemented as instructions stored in the memory, that when accessed by the one or more processors, result in actions that accomplish the functionality associated with DCPL 230A. One or more example processing systems that may be included in PE router 150 are described below with reference to FIG. 4.

Figure 2B:
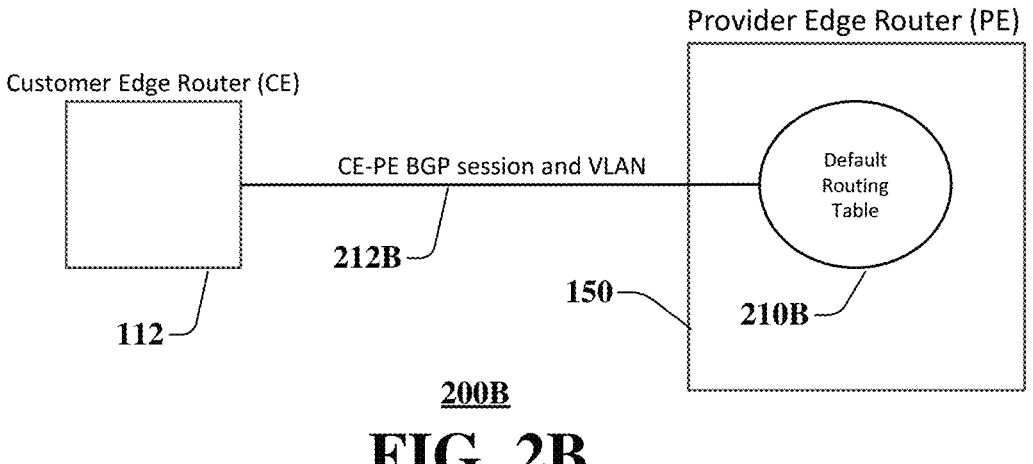
FIGS. 2B-2E are block diagrams illustrating an example, non-limiting embodiment of on-demand VRF provisioning in a PE router in accordance with various aspects described herein.

FIGS. 2B-2E are block diagrams illustrating an example, non-limiting embodiment of on-demand VRF provisioning in a PE router in accordance with various aspects described herein. FIG. 2B shows state 200B in which CE router 112 and PE router 150 have an active BGP session and virtual local area network (VLAN) 212B that terminates into default routing table 210B. In some embodiments, default routing table includes interfaces to all customer devices accessing PE router 150.

Figure 2C:
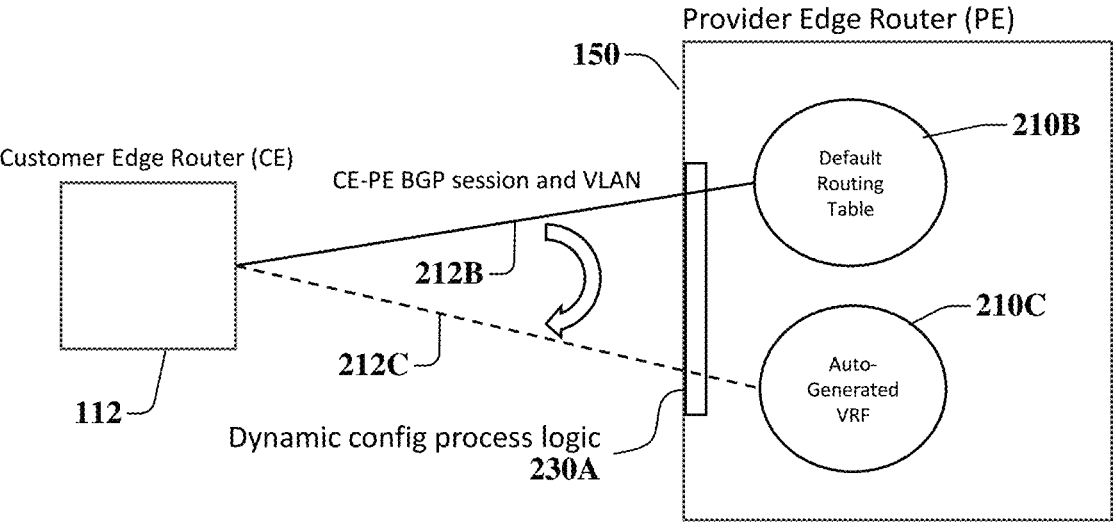

FIG. 2C shows CE router 112 and PE router 150 in a state 200C that exists after CE router 112 has requested on-demand instantiation and provisioning of a VRF by announcing a BGP attribute that was previously assigned to the customer for this purpose. DCPL 230A parses the BGP message and determines if an attribute is recognized as being an attribute previously assigned to a customer for on-demand VRF provisioning. For example, DCPL 230A may determine whether any community values within BGP messages match any known community values previously assigned to customers for this purpose. When a community value is recognized, DCPL 230A instantiates VRF 210C by making a copy of VRF template 220A (FIG. 2A). At this point, DCPL has begun a transition from using default routing table 210B (communications at 212B) to using VRF 210C (communication 212C).

Figure 2D:
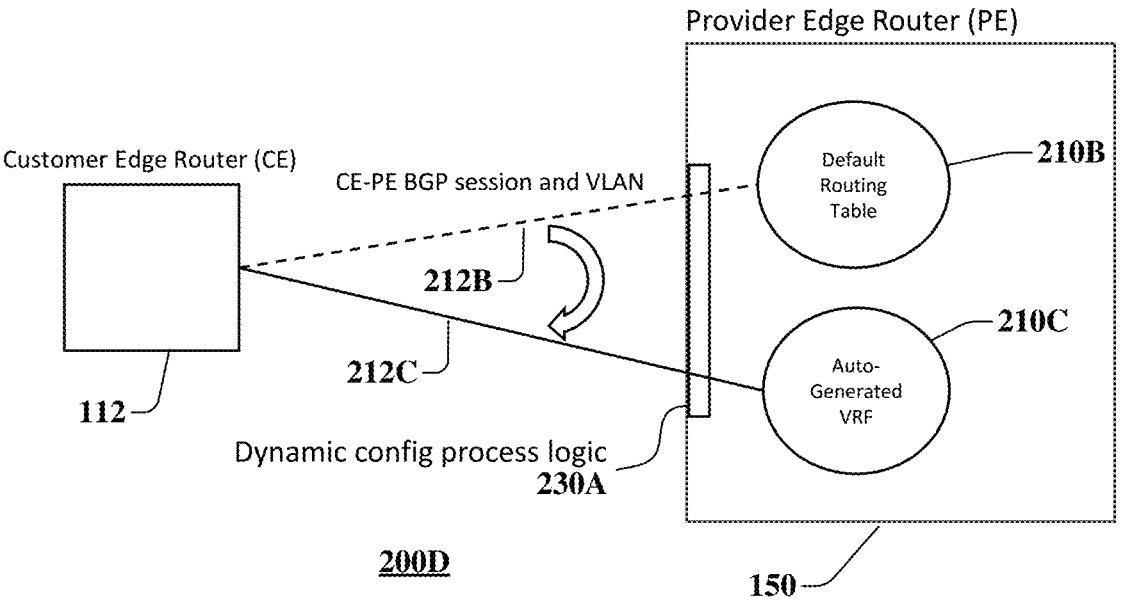
Figure 2E:
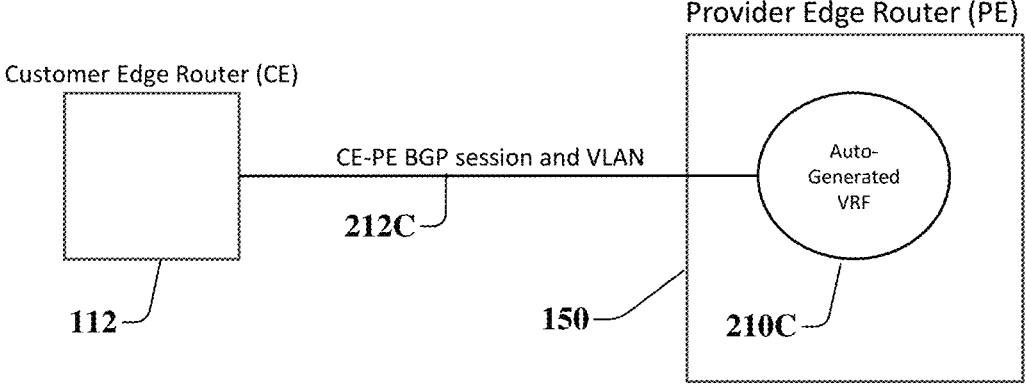

FIG. 2D shows the continued provisioning of VRF 210C and transitioning from using default routing table 210B (communications at 212B) to using VRF 210C (communication 212C). After instantiating VRF 210C as described above with reference to FIG. 2C, DCPL 230A determines one or more route targets by accessing a mapping table such as CV to RT mapping table 240A (FIG. 2A). VRF 210C is then populated with the route target(s) as determined by the BGP attribute(s). At FIG. 2E, an interface is moved from default routing table 210B to VRF 210C, and at this point, the BGP session and VLAN communication between CE router 112 and PE router 150 terminates at VRF 210C.

FIG. 2F depicts illustrative embodiments of methods in accordance with various aspects described herein. Method 200F may be performed by a network element such as a router, dynamic configuration process logic on a router, a processor, or any system capable of instantiating a VRF. At 210F, a BGP attribute is received from a customer edge router. In some embodiments, this corresponds to receiving a community value in a BGP update message. The community value may have been previously assigned to the customer and associated with a route target for a specific VPN connection.

At 220F, a value of the BGP attribute is compared to a known value. In some embodiments, this corresponds to comparing a received BGP community value with all community values on a list of values, where the list corresponds to VPNs that are authorized to be used by customers that connect using the router that received the BGP update message.

At 230F, a VRF instance is instantiated to route traffic received from the CE router. In some embodiments, the VRF instance is instantiated by copying a template and then indexing into a CV to RT mapping table to determine one or more route targets to populate the newly instantiated VRF. An interface is moved from a default routing table to the VRF to cause traffic to be routed according to the VRF rather than the default routing table.

In some embodiments, the PE router may receive a second BGP attribute that corresponds to a request to revert back to using the default routing table (no longer using the VPN). When this attribute is recognized, the interface may be moved from the VRF back to the default routing table, and the VRF may be deleted. In some embodiments, the PE (or another element with the communication network) may track the amount of time the VRF was in use, or the amount of data traffic routed in accordance with the VRF, and this information may be used to determine a charge for the VPN service.

FIG. 2G depicts illustrative embodiments of methods in accordance with various aspects described herein. Method 200G may be performed by an operator of a communications network, a network element such as a router, dynamic configuration process logic on a router, a processor, or any system capable provisioning a PE router to be able to instantiate a VRF.

At 210G, a customer specific BGP attribute is assigned to a CE router. The customer specific BGP attribute may a community value that has been assigned to a user, customer, group of users, or enterprise for the purpose of requesting on-demand instantiation and provisioning of VRFs, and identifying route targets to populate the VRFs. The customer specific BGP attribute is added to a list of attributes on a PE router. The list will be used to compare to BGP attributes received at the PE router from the CE router in the future to determine if a customer is requesting on-demand instantiation and provisioning of a VRF.

At 220G, the PE router is populated with a VRF template, an interface template, a route mapping table, and dynamic configuration process logic. In some embodiments, this corresponds to populating PE router 150 (FIG. 2A) with VRF template 220A, interface template 210A, CV to RT route mapping table 240A, and dynamic configuration process logic 230A.

At 230G, the route mapping table is updated in multiple PEs. In some embodiments, this corresponds to updating mapping tables in all PEs with on-demand VRF instantiation and provisioning capabilities whenever a new community value is assigned to a customer, group of customers, enterprise, CE, or the like.

While for purposes of simplicity of explanation, the respective processes are shown and described as a series of blocks in FIGS. 2F and 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Various embodiments described herein provide for a removal of a specific function from automation systems and placing it in network elements such as routers. The self-provisioning construct allows the routers to add some configuration based on customer demand. With self-provisioning, the device can add a virtual routing and forwarding (VRF) instance. By default, customers are attached to a provider PE using Border Gateway Protocol (BGP). Also by default, the BGP instance terminates into the global routing table and not a specific VRF. However, the customer may elect to subscribe to Virtual Private Networking (VPN) services where a VRF is required. In this instance, the customer can announce a BGP community value (CV) to the PE that triggers the PE to place the customer interface into a newly created VRF context. The VRF is instantiated based on the CV, however the VRF does not connect to any existing VPNs. The customer then announces BGP updates with a BGP CV, assigned to the customer by the provider, for the purpose of VRF creation and connecting to an existing VPN. Once the VRF is created, the route-targets assigned to the VRF are derived from a CV to RT mapping table. The mapping table on the PE correlates CVs to RTs. When there is a match between CV and RT, the corresponding RT is used as import and export statement on the VRF, completing the VRF instantiation process. If there is no match between CV and RT, the customer is not permitting to exchange paths with other VRFs.

The various embodiments described herein allow a user or CE device to determine when to request on-demand instantiation and provisioning of a VRF using any criteria or method. For example, in some embodiments, the service may be offered on a transactional basis. Whenever a user requests to access a certain domain or perform a certain transaction, the CE router may recognize this and request on-demand VRF creation on behalf of the user. For example, every time a user accesses a particular financial institution, the CE router may perform the request on behalf of the user by including a community value that maps to a route target for a VPN connection to the financial institution. In some embodiments, the request for on-demand VRF creation may be time based. For example, a CE providing connectivity to an employee may request on-demand VRF creation at 8 AM on weekdays, and then request that the employee revert back to a nonsecure connection at 5 PM on weekdays. In still further embodiments, a user may select to move to a secure connection by interacting with a computer program or mobile device app. For example, a user may the option of access email using an unsecure connection or a secure connection. When the user decides to use a secure connection, the CE will request on-demand VRF instantiation and provisioning.

Figure 3:
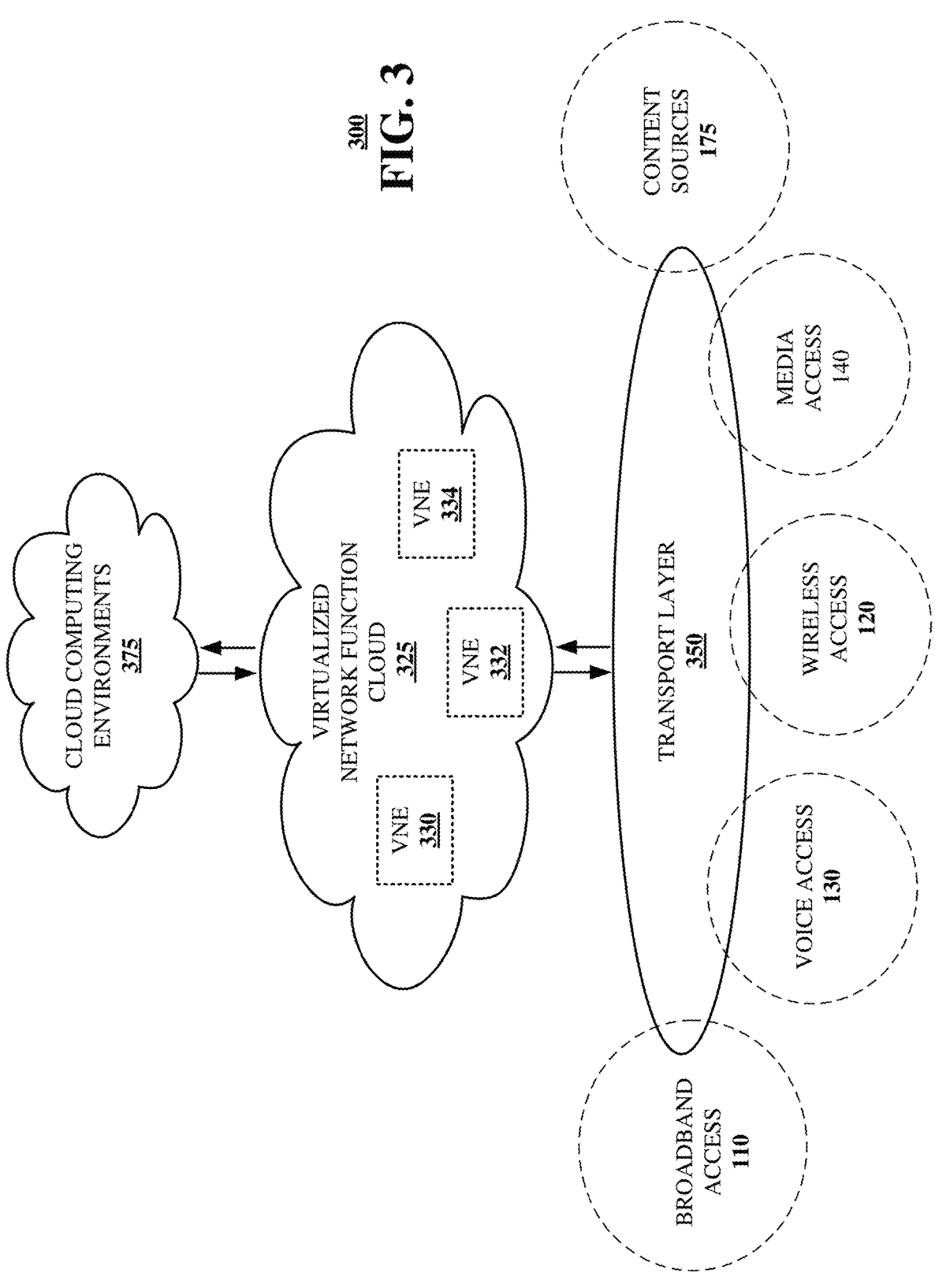
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions presented in the previous figures. For example, virtualized communication network 300 can facilitate in whole or in part on-demand VRF creation and provisioning at a CE router.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
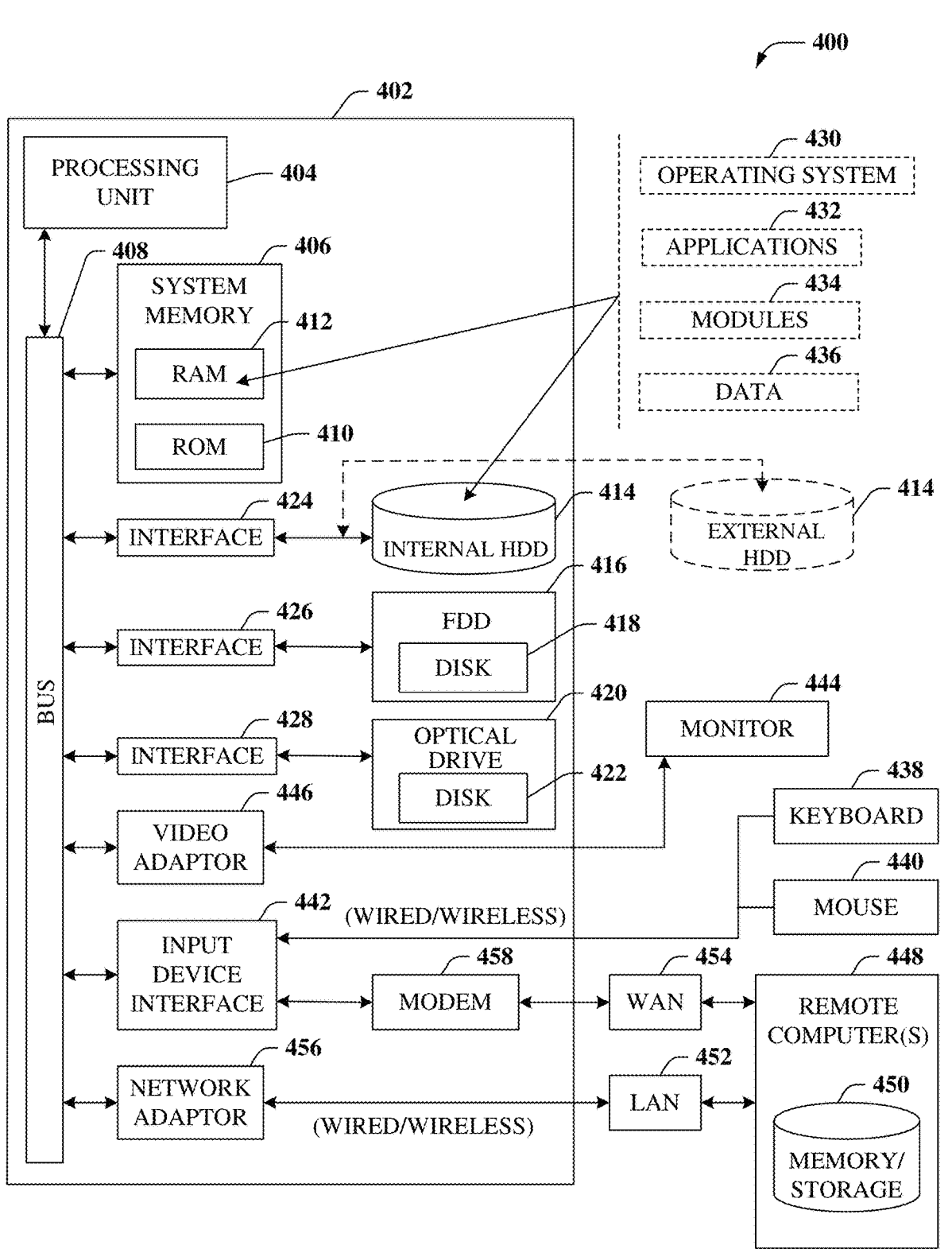
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part on-demand VRF creation and provisioning at a CE router.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
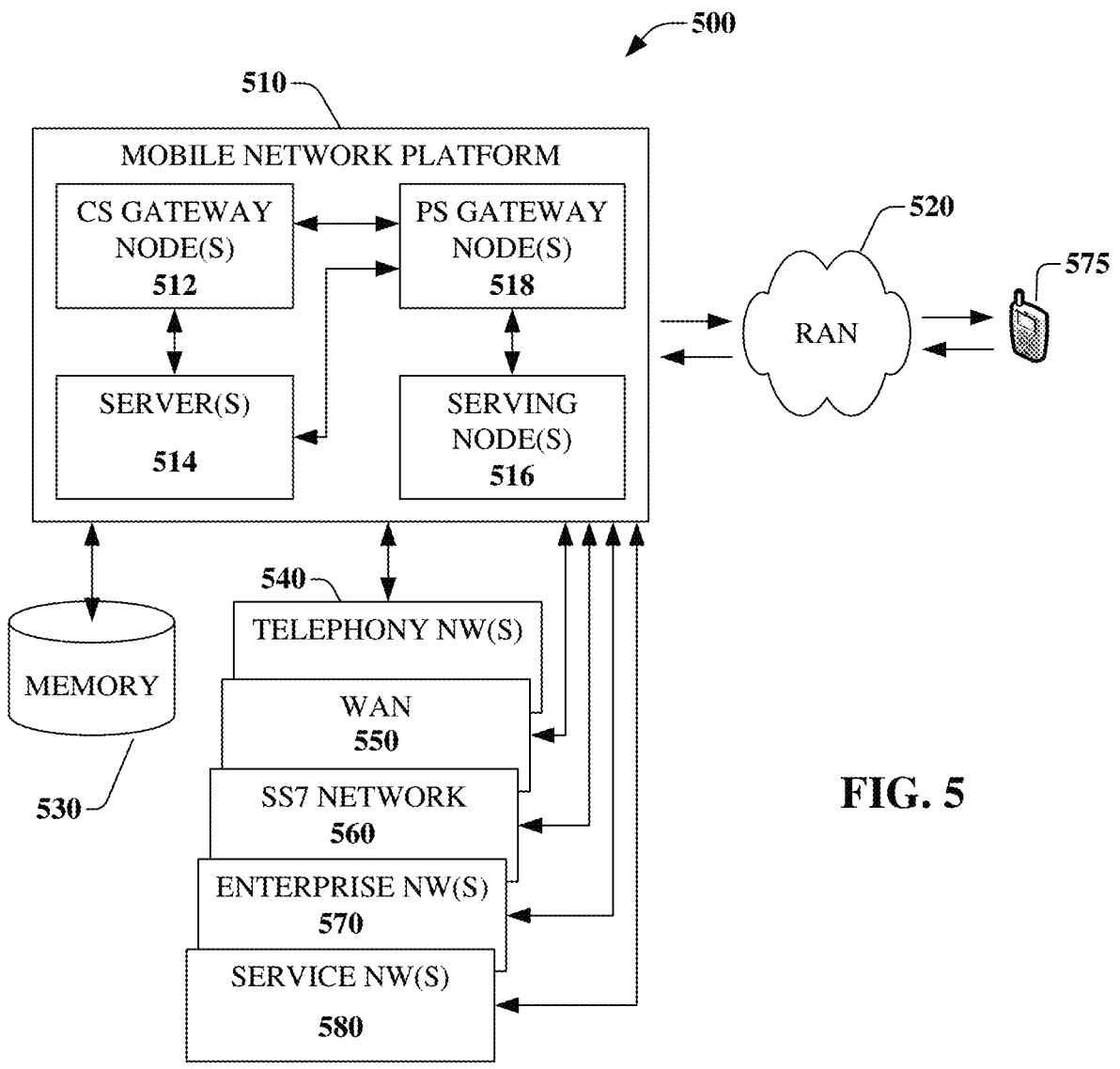
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part on-demand VRF creation and provisioning at a CE router. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers;

and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
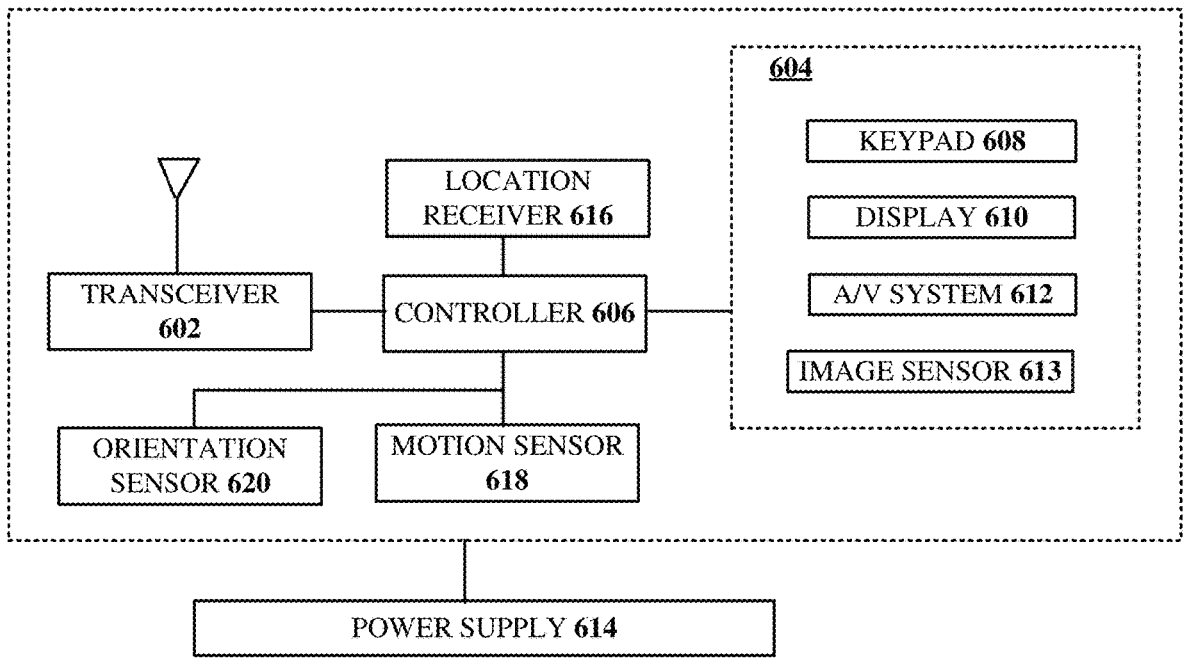
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part on-demand VRF creation and provisioning at a CE router.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
storing a table on the device, the table mapping a plurality of community values (CVs) to a plurality of route targets;
assigning a customer-specific community value to a customer edge (CE) router;
subsequent to the storing and the assigning, receiving a first border gateway protocol (BGP) attribute from the CE router, wherein the first BGP attribute includes the customer-specific community value;
determining that the customer-specific community value matches one of a plurality of known community values;
responsive to the determining, instantiating a virtual routing and forwarding (VRF) instance to route traffic received from the CE router;
populating the VRF instance by mapping the customer-specific community value to a route target using the table stored on the device; and
tracking an amount of time that the VRF instance is in place, in order to determine an amount to charge for use of the VRF instance.

2. The device of claim 1, wherein the device comprises a provider edge (PE) router.

3. The device of claim 1, wherein the receiving the first BGP attribute comprises:
receiving a BGP update message from the CE router; and
detecting a community value within the BGP update message.

4. The device of claim 1, wherein the instantiating the VRF instance comprises copying a VRF template to create the VRF instance.

5. The device of claim 4, wherein the operations further comprise mapping the value of the first BGP attribute to a route target to populate the VRF instance.

6. The device of claim 5, wherein the operations further comprise receiving updates to the table.

7. The device of claim 5, wherein the operations further comprise tracking the amount of data that traverses a VPN using an on-demand VRF to determine an amount to charge a user or enterprise for the secure connection.

8. A non-transitory, machine-readable medium, comprising executable instructions that, when executed by a processing system including a processor, facilitate performance of operations, the operations comprising:

assigning a customer-specific community value to a customer edge (CE) router;

receiving a first border gateway protocol (BGP) attribute directly from the CE router, wherein the first BGP attribute includes the customer-specific community value;

determining that the customer-specific community value matches one of a plurality of known community values;

responsive to the determining, instantiating a virtual routing and forwarding (VRF) instance to route traffic received from the CE router;

populating the VRF instance by mapping the customer-specific community value to a route target using a table stored in the processing system; and tracking an amount of data movement, in order to determine an amount to charge for use of the VRF instance.

9. The non-transitory, machine-readable medium of claim 8, wherein the processing system comprises a provider edge (PE) router.

10. A method, comprising:

assigning, by a processing system including a processor, a customer-specific community value to a customer edge (CE) router;

receiving, by the processing system, a first border gateway protocol (BGP) attribute from the CE router, wherein the first BGP attribute comprises the customer-specific community value;

comparing, by the processing system, a value of the customer-specific community value to a plurality of known attribute values;

responsive to the comparing, instantiating, by the processing system, a virtual routing and forwarding (VRF) instance to route traffic received from the CE router;

populating the VRF instance by mapping the value of the customer-specific community value to a route target using a table stored in the processing system, the table mapping a plurality of community values to a plurality of route targets; and subsequent to the instantiating, receiving, by the processing system, a second community value from the CE router, wherein the second community value is indicative of a request to return to a default routing context.

11. The method of claim 10, wherein the receiving the first BGP attribute comprises:

receiving, by the processing system, a BGP update message from the CE router; and detecting, by the processing system, the customer-specific community value within the BGP update message.

12. The method of claim 10, wherein the instantiating the VRF instance comprises copying, by the processing system, a VRF template to create the VRF instance.

13. The method of claim 12, wherein the method further comprises receiving, by the processing system, updates to the table stored in the processing system.

14. The method of claim 12, wherein the receiving the first BGP attribute includes directly receiving, by the processing system, the first BGP attribute from the CE router.

15. The device of claim 2, wherein the plurality of known community values corresponds to a list of VPNs that are authorized to be used by the PE router.

16. The device of claim 1, wherein the customer-specific community value is associated with a route target for a specific VPN connection.

17. The device of claim 1, wherein the operations further comprise tracking an amount of data that traverses the VRF instance, in order to determine an amount to charge for use of the VRF instance.

18. The non-transitory, machine-readable medium of claim 9, wherein the plurality of known community values corresponds to a list of VPNs that are authorized to be used by the PE router.

19. The non-transitory, machine-readable medium of claim 8, wherein the customer-specific community value is associated with a route target for a specific VPN connection.

20. The non-transitory, machine-readable medium of claim 8, wherein the operations further comprise tracking an amount of time that the VRF instance is in place or an amount of data that traverses the VRF instance, in order to determine an amount to charge for use of the VRF instance.

* * * * *